Oct. 14, 1958 M. SCHOR 2,855,707
STRIPPABLE LABEL AND METHOD
Filed Aug. 7, 1953
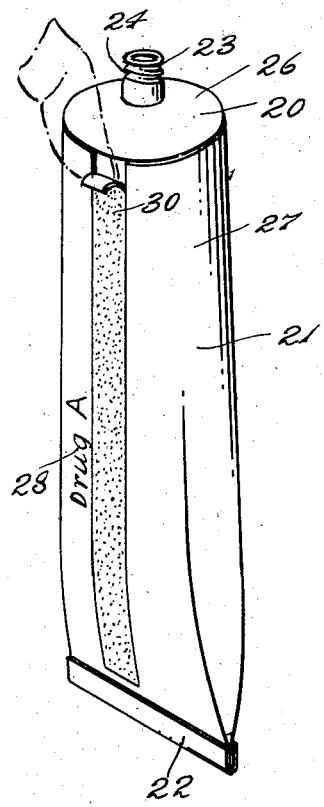
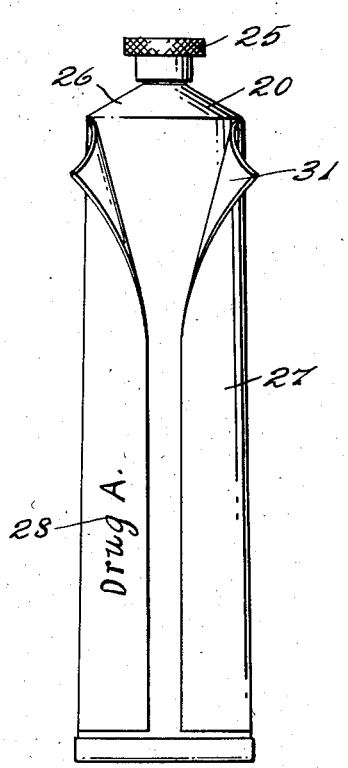
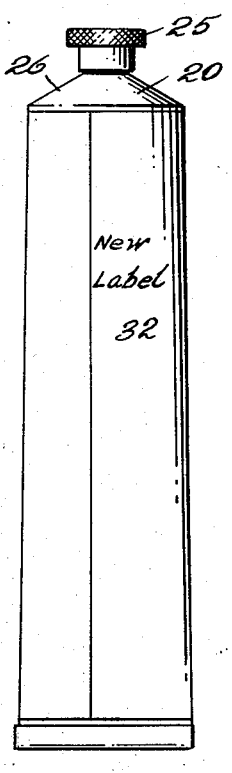
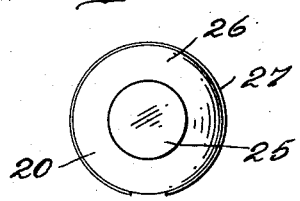
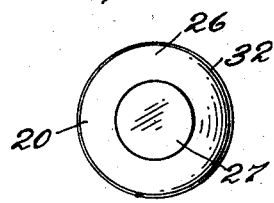
INVENTOR
Milton Schor.
BY
ATTORNEYS

United States Patent Office 2,855,707
Patented Oct. 14, 1958

2,855,707

STRIPPABLE LABEL AND METHOD

Milton Schor, Havertown, Pa., assignor to A. H. Wirz, Inc., Chester, Pa., a corporation of Pennsylvania Application August 7, 1953, Serial No. 372,963

7 Claims. (Cl. 40—21)

The present invention relates to container labels and methods of producing the same, particularly for pharmaceutical purposes and especially on collapsible tubes and the like.

A purpose of the invention is to produce a container label which will carry label information, and will meet the requirements of service, especially being neat, moisture resistant, and likely to remain in place as long as desired, but which will be readily strippable by tearing and peeling so that it can be replaced by a special label as desired, or the tube may be used without any label.

A further purpose is to apply a resinous film-forming label, based on the collapsible tube or other container, continuously around the container so that the adherence of the film to itself will hold it in place as an endless band closely conforming to the outside of the container without tack or adhesive bonding to the container, and the label will be capable of receiving printing ink layers containing label information.

A further purpose is to render the thermoplastic resin-forming material non-adhesive or non-tacky by introducing a relative excess of plasticizer, using from 25 to 75 percent by weight of plasticizer and preferably 50 to 60 percent, the percentages being based on the weight of vinyl solids.

A further purpose is to introduce a stripping compound into a thermoplastic film-forming label base resin, the stripping compound desirably being oleyl amide.

A further purpose is to employ as the resin a vinyl resin such as a mixture of vinyl chloride and vinyl acetate in proportions between 87 and 91 percent vinyl chloride by weight, or vinyl chloride, or to use an acrylic ester resin such as a polymer of ethylacrylate or a copolymer of ethylacrylate and methylacrylate in any proportions.

A further purpose is to vary the hardness of the resins, by controlling the quantity of plasticizer and of pigment and the temperature and time of baking.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a perspective of the completed container of the invention, showing the first step in stripping the label. Figure 1 omits the cap.

Figure 2 is a side elevation showing the peeling of the label.

Figure 3 is an end elevation of Figure 2.

Figure 4 is a side elevation showing the container after the new label has been applied.

Figure 5 is an end elevation of Figure 4.

Describing in illustration but not in limitation and referring to the drawings:

In the pharmaceutical trade many products are packaged by the drug manufacturer and supplied to the druggist bearing the drug manufacturer's label which designates the product and gives necessary information such as dosage, recommended use, code number, and the like.

When, however, the product is prescribed by a physician and in some cases also where it is sold by the druggist, it is normal practice to remove the paper label on the container applied by the drug manufacturer, substituting the druggist's label, which often bears special information such as the name of the patient, the particular dosage as prescribed by the physician, the prescription number, the precautions for storage, the precautions for use in the particular case and the physician's name. This practice has precluded the use of collapsible tubes with printed labels applied directly to the tube surface, and has necessitated the application by the drug manufacturer of special paper labels. The paper labels are susceptible to damage by moisture, insects and the like, and are trouble some to remove, often involving scraping, soaking, or the like. This requirement has in some cases prevented the drug manufacturer from using collapsible tubes where they would otherwise be very desirable for packaging the particular product, since, of course, paper labels are not very satisfactory for collapsible tubes because they do not remain in contact with the wall after the tube is squeezed, but are likely to pull away and later tear. The manufacturer must go to additional expense to apply paper labels, and many tubes are damaged in labeling.

In accordance with the present invention a label is applied which completely surrounds the smooth metallic wall of the container and "fits it like a glove," but which is readily strippable therefrom. Thus the cohesion of the plastic layer within itself holds the layer in place on the collapsible tube until the user desires to remove the label, and then, as the layer is not adhesively bonded and does not have tack with respect to the container wall, the layer peels off readily to produce a clean container surface on which a new label can be applied, or which can be used unlabeled.

Any suitable thermoplastic resin may be used for the label layer, the preferred resin being a vinyl resin, such as a copolymer of vinyl chloride and vinyl acetate, or vinyl chloride polymer, other suitable thermoplastic resins being acrylic ester resins.

The resin is formulated to make it strip by overplasticizing, using from 25 to 75 percent by weight and preferably from 50 to 60 percent by weight of the vinyl solids as plasticizer. Also oleyl amide may desirably be used as a blocking compound to suppress tack. The label base layer is applied in any suitable way, preferably by roller coating on the usual roller coating machines, used for labeling collapsible tubes, but permissibly by spraying or dipping. It is then dried, preferably being dried or baked at a temperature between 50 and 400° F. Time is an inverse function of temperature, the time being 8 to 24 hours at room temperature, about 20 minutes at 255° F., about three minutes at 300° F. and less than a minute at 400° F. Over the base layer, printing is applied, preferably using roller printing with the usual printing inks which apply the information desired on the label, including the name of the product and the maker, the trade mark, the instructions, code number and ornamentation. The printing ink should preferably be dried like the label base layer.

The label as thus provided can, if desired, be retained and will go through to the ultimate user. It adheres much more closely to the tube when the tube is squeezed, being much more pliable than a paper label and is water resistant, and resistant to insects.

If, however, the druggist or any other intermediate seller desires to remove the manufacturer's label this can be done by tearing it and it will then readily peel off. The fingernail can be used for tearing and the fingers for peeling. A subsequent paper or other label can then be applied as desired, or the tube can be used unlabeled.

Figure 1 shows a collapsible tube 20 which is filled with a suitable drug or other content, and has a side wall 21 of cylindrical shape, a sealed end 22, a discharge spout 23, suitably threaded at 24 and receiving a cap 25, and a shoulder 26 around the spout. The side wall 21 is extruded from metal, desirably aluminum, lead base alloy, tin base alloy or the like.

In accordance with the invention, a label base 27 of resin-forming plastic as later explained is applied entirely around the collapsible tube encircling it, but being specially compounded as explained herein so that it does not bond to the side wall. The layer 27 is desirably of the thickness normally obtained by roller coating, which may range between 0.0004 and 0.0008 inch. After the base layer has at least partially dried, printing 28, containing the label information, is applied on the label base layer.

When the druggist or other intermediate seller desires to remove the manufacturer's label it is merely necessary to tear it as by plowing off the strip 30 with the fingernail, leaving a clean metallic surface underneath. The layer can then be peeled with the fingers as by pulling up the edges 31 and removing the entire label which does not adhesively adhere to the collapsible tube but is strippable. Finally, a new label 32 is applied, if desired, using paper or the like.

The following is an example of the compounding of the strippable label base layer:

*Example I*

| Material: | Parts by weight |
|---|---|
| Vinyl resin VYNS | 190 |
| Vinyl resin VYLF | 180 |
| Di(2 ethylhexyl)phthalate | 100 |
| Pigment (titanium dioxide) | 165 |
| Solvent (isophorone) | 1000 |

The vinyl resin VYNS is 90 percent vinyl chloride and 10 percent vinyl acetate copolymerized. The vinyl resin VYLF is 87 percent vinyl chloride and 13 percent vinyl acetate copolymerized. The VYNS can be replaced wholly or partly by VYCM.

Instead of the plasticizer mentioned, di(2 ethylhexyl) phthalate, any suitable plasticizer compatible with vinyl resins may be used, other examples being dibutyl phthalate, tricresyl phosphate, dioctyl adipate may be used.

The vinyl resin may be either vinyl chloride polymerized or a copolymer of from 87 percent to 91 percent vinyl chloride with vinyl acetate.

Instead of titanium dioxide any suitable pigment may be employed, other examples being barium sulphate, lithopone, iron oxide, chromic oxide, phthalocyanine green or blue and the like. The quantity of pigment will vary with the desired coverage, and will normally range between 10 and 40 percent by weight of the total solids and preferably between 15 and 40 percent.

While the preferred solvent is isophorone, which is desirable because of its relatively high boiling point and low volatility, which suits it for roller coating, other suitable solvents are cyclohexanone, methylisobutyl ketone, ethyl-butyl ketone or other solvents for the particular resin. For spraying purposes methyl-ethyl ketone can be used, or other appropriate solvent.

The strippable coating may be as concentrated as 50 percent solids, or as dilute as 20 percent solids by weight.

*Example II*

| Material: | Parts by weight |
|---|---|
| Vinyl resin VYNS | 190 |
| Vinyl resin VYLF | 180 |
| Dioctyl phthalate | 120 |
| Pigment (titanium dioxide) | 160 |
| Solvent (isophorone) | 825 |

In this example the increase in plasticizer tends to make the coating strip more easily although there is a slight increase in tack.

*Example III*

| Material: | Parts by weight |
|---|---|
| Vinyl resin VYCM | 20 |
| Acrylic resin (ethyl acrylate polymer) 48% by weight in toluene | 240 |
| Plasticizer (dioctyl phthalate) | 15 |
| Pigment (titanium dioxide) | 150 |
| Solvent (isophorone) | 200 |

*Example IV*

The preferable formulation based on the weight of solids is as follows:

| | Percent |
|---|---|
| Vinyl resin VYNS | 33.3 |
| Dioctyl phthalate | 16.7 |
| TiO$_2$ | 50.0 |
| Isophorone | 66.6 |

The plasticizer is combined with the resin and the mixture is then ground with the pigment and the entire combination is then dissolved in the solvent.

For better hiding power the pigment can be increased but the strength of the film is correspondingly reduced.

In order to obtain differences in film strength, flow characteristics and heat resistance the plasticizer can be changed or the dioctyl phthalate can be mixed with other plasticizers such as dibutyl phthalate, and the quantity of the plasticizer can be varied within the range specified above. It will of course be understood that the increase in plasticizer content increases the flexibility of the base layer. Generally the higher the content of the plasticizer the greater the strippability of the base layer, but too much plasticizer may cause the ink to smear. A grossly excessive content of plasticizer tends to increase tack.

For various coating equipment the viscosity of the coating liquid for the base layer can be varied by changing the solvent and changing the amount of solvent.

A suitable nontacky strippable label can also be produced by employing acrylic resin in the range from 400 to 600 percent of the vinyl solids.

*Example V*

| Material: | Parts by weight |
|---|---|
| Vinyl resin VYCM | 110 |
| Acrylic resin (ethyl acrylate polymer) 48% by weight in toluene | 1180 |
| Pigment (titanium dioxide) | 675 |
| Solvent (isophorone) | 1200 |

The vinyl resin VYCM (91 percent vinyl chloride and 9 percent vinyl acetate by weight) can be replaced partially or wholly by VYNS or a combination of VYNS with VYLF up to 25 percent of the VYCM by weight. Where there is a partial replacement of VYCM with VYLF up to 25 percent of the vinyl solids the solid content can be increased to 130 parts without materially increasing the viscosity. At the expense of some reduction in film strength, the vinyl resin content can be reduced to 90 parts.

As already explained, the pigment content can be varied and different pigments can be used.

It is desirable in many cases to reduce the tack by employing oleyl amide in proportions of 1 to 5 percent of the total resin solids, and preferably 3 percent by weight. The total resin solids include the vinyl and the acrylic solids.

*Example VI*

| Material: | Parts by weight |
|---|---|
| Vinyl resin VYNS | 32 |
| Acrylic resin (ethyl acrylate polymer 50% in toluol by weight) | 65 |
| Pigment (titanium dioxide) | 30 |
| Oleyl amide | 3 |
| Solvent (isophorone) | 230 |

The vinyl resin can be increased with increase in viscosity to 40 parts and can be reduced to 25. VYNS can be replaced by VYLF up to 25 percent by weight of the resin. Oleyl amide can be increased to 5 percent, but it gives a slippery feel on the total resin.

*Example VII*

The preferred resin used is 90 percent by weight of vinyl chloride and 10 percent by weight of vinyl acetate copolymerized (VYNS). The preferred combination is as follows:

| Material: | Parts by weight |
|---|---|
| Vinyl resin VYNS | 55 |
| Oleyl amide | 2 |
| Unmodified polyester resin based on long chain polybasic acid esterified with polyhydric alcohol | 25 |
| Di(2 ethylhexyl)phthalate | 15 |
| Titanium dioxide | 15 |
| Isophorone | 220 |

The oleyl amide may vary from 1 to 5 percent on the basis of the resin solids. The unmodified polyester resin based on a long chain polybasic acid esterified with polyhydric alcohol may vary 25 to 80 percent on the basis of the resin solids. The vinyl resin can be increased slightly but any appreciable increase will make the solution too viscous. The vinyl resin (VYNS) can be replaced by using 25 percent on the weight of the solids of vinyl resin VYLF (a copolymer of 87 percent vinyl chloride and 13 percent vinyl acetate). The total of the vinyl resin can be increased to approximately 70 parts under these conditions without increasing the viscosity materially. The total quantity of vinyl resin can be reduced to 45 parts.

The titanium dioxide can be increased to 25 parts or reduced to 10 parts. Other opaque pigments, such as blues, blacks and reds can replace the titanium dioxide.

Solvents as mentioned, such as cyclohexanone, methyl isobutyl ketone or other vinyl solvents may be used, keeping in mind that for roller coating high boiling solvents are desired.

Plasticizers such as di(2 ethylhexyl)phthalate can be replaced by unmodified polyester resin based on long chain polybasic acid esterified with polyhydric alcohol. If the coating is to be baked at high temperature, above 350° F., a non-volatile plasticizer should be used but for low baking temperature a more volatile plasticizer such as dibutyl phthalate can be used.

In view of my invention and disclosure variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention, what I claim as new and desire to secure by Letters Patent is:

1. The method of providing a removable label on a cylindrical side wall of a collapsible tube, which comprises coating completely around the cylindrical side wall of a collapsible tube a layer of a film forming strippable resin composition dissolved in a solvent, which resin composition on becoming solid having the property of forming an endless tough plastic layer extending around the side wall, cohering to the side wall and having free peeling properties when broken and pulled from the side wall of the tube, evaporating the solvent and thereby causing the layer to solidify in intimate contact with the collapsible tube wall, and rotary printing label information on the outside surface of the plastic layer thus intimately formed around the side wall of the tube.

2. The method of forming a strippable label around the cylindrical side wall of a collapsible tube, which comprises coating the side wall of the collapsible tube completely around its circumference with a layer of film forming resin composition dissolved in a solvent, said resin solution being over-plasticized by adding a vinyl resin plasticizing agent in amounts from 25% to 75% calculated by weight on vinyl resin, which resin composition on becoming solid having the property of forming an endless tough plastic layer extending around the side wall, cohering to the side wall and having free peeling properties when broken and pulled from the side wall of the tube, evaporating the solvent and thereby causing the layer to solidify in intimate contact with the collapsible tube wall, and rotary printing label information on the outside surface of the layer thus intimately formed around the side wall of the tube.

3. The method of claim 1, in which the resin used for coating the cylindrical side wall of the collapsible tube is a vinyl acrylic resinous composition including 400% to 600% acrylic resin based on the weight of the vinyl resin in the composition.

4. The method of claim 1, in which the resin used for coating the cylindrical side wall of the collapsible tube is a vinyl resinous composition containing 1% to 5% oleyl amide based on weight of the resin solids in the composition.

5. In combination with a collapsible tubular metal container, an end thereon adapted to be closed by crimping and an opposite discharge end, a thin coating of a film forming resin composition extending entirely around the body of said tube between the opposite ends of said tube and terminating lengthwise short of at least one of said ends, said coating itself cohering to the metal surface of said tube throughout the area of the tube covered by said coating and being capable of remaining intact when the tube and coating are deformed at the same point, said coating further having peeling properties when broken, lifted, and pulled, and said coating having printed matter on the outside surface thereof and accordingly serving as a label until broken and peelably removed.

6. The collapsible tubular metal container in claim 5, in which the coating is a vinyl resinous composition including 400% to 600% acrylic resin by weight of the vinyl resin solids in the composition.

7. The collapsible tubular metal container in claim 5, in which the coating is a vinyl resinous composition including 1% to 5% oleyl amide based on the weight of resin solids in the composition.

References Cited in the file of this patent

UNITED STATES PATENTS

| | | |
|---|---|---|
| 1,756,944 | Gorton | May 6, 1930 |
| 1,899,066 | Tonge | Feb. 28, 1933 |
| 1,913,839 | Lermer | June 13, 1933 |
| 2,215,340 | Vasen | Sept. 17, 1940 |
| 2,255,810 | Replogle | Sept. 16, 1941 |
| 2,264,625 | Doolittle | Dec. 21, 1941 |
| 2,333,887 | Redlinger | Nov. 9, 1943 |
| 2,337,348 | Prindle | Dec. 21, 1943 |
| 2,372,982 | Richards | Apr. 3, 1945 |
| 2,437,184 | Brady | Mar. 2, 1948 |